United States Patent [19]

Kresge et al.

[11] Patent Number: 4,493,764
[45] Date of Patent: Jan. 15, 1985

[54] SEPARATELY SUPPORTED POLYMETALLIC REFORMING CATALYST

[75] Inventors: Charles T. Kresge, Sewell; Sowmithri Krishnamurthy, Cherry Hill; William D. McHale, Swedesboro, all of N.J.

[73] Assignee: Mobil Oil Corporation, New York, N.Y.

[21] Appl. No.: 618,791

[22] Filed: Jun. 8, 1984

Related U.S. Application Data

[62] Division of Ser. No. 525,778, Aug. 24, 1983.

[51] Int. Cl.³ .............................................. C10G 35/06
[52] U.S. Cl. ..................................... 208/138; 208/139
[58] Field of Search ................................ 208/138, 139

[56] References Cited

U.S. PATENT DOCUMENTS

| | | | |
|---|---|---|---|
| 3,487,009 | 12/1969 | Jacobson et al. | 208/138 |
| 3,578,583 | 5/1971 | Buss | 208/138 |
| 3,660,271 | 5/1972 | Keith et al. | 208/138 |
| 4,263,134 | 4/1981 | Schoennagel | 208/138 |
| 4,264,475 | 4/1981 | Schoennagel | 502/333 |
| 4,276,152 | 6/1981 | McHale et al. | 208/138 |
| 4,288,348 | 9/1981 | Schoennagel | 208/138 |
| 4,298,461 | 11/1981 | Pellet et al. | 208/138 |
| 4,319,984 | 3/1982 | Pellet et al. | 208/138 |
| 4,349,433 | 9/1982 | Schoennagel | 208/138 |

Primary Examiner—Curtis R. Davis
Attorney, Agent, or Firm—A. J. McKillop; M. G. Gilman; J. F. Powers, Jr.

[57] ABSTRACT

There is provided, in accordance with the present invention, a catalyst composition made up of a mixture of two components, one component comprising a minor proportion of platinum and rhenium on a support and the second component comprising a minor proportion of iridium and rhenium on a separate support. A process for reforming a charge stock, such as naphtha, utilizing such catalyst is also provided.

5 Claims, No Drawings

SEPARATELY SUPPORTED POLYMETALLIC REFORMING CATALYST

CROSS-REFERENCE TO RELATED APPLICATION

This application is a division of application Ser. No. 525,778, filed Aug. 24, 1983.

BACKGROUND OF THE INVENTION

1. Field of the Invention

This invention relates to a catalyst composition containing platinum, rhenium and iridium where (1) platinum and rhenium and (2) iridium and rhenium are contained on separate particles of a refractory support and to the reforming of selected petroleum fractions in the presence of this catalyst to obtain gasoline of high octane number.

2. Description of the Prior Art

Catalysts intended for use in reforming operations wherein hydrocarbon fractions such as naphthas or gasolines or mixtures thereof are treated to improve the anti-knock characteristics thereof are well known in the petroleum industry and have been the subject of intensive investigation in both the patent and technical literature.

It has heretofore been proposed to employ platinum metal-containing catalysts for promoting reforming. Such catalysts are necessarily characterized by a certain amount of acidity. One type of reforming catalyst which has been used commercially consists of alumina base material having platinum metal impregnated thereon, with the acidity characteristics being contributed by a small amount of halogen incorporated in the catalyst.

In more recent years, multi-metallic reforming catalysts have been the subject of patent and technical literature. These catalysts contain platinum together with one or more additional metals, such as ruthenium, germanium, iridium, palladium, rhenium, osmium, rhodium, copper, silver, tin or gold deposited on a refractory support which also contains a specified amount of halogen. Representative of these multi-metallic reforming catalysts are those containing platinum and rhenium on platinum and iridium such as described in U.S. Pat. Nos. 2,848,377; 3,415,737 and 3,953,368. The latter patent reports certain advantages when platinum and iridium are present on a refractory support as highly dispersed polymetallic clusters in which the metallic atoms are separated by a distance of about 2.5-4.0 Angstroms.

It has also heretofore been known to conduct catalytic reforming utilizing a catalyst consisting essentially of a particularly defined mixture of particles of a porous carrier impregnated with a small amount of platinum and particles of an acidic cracking component. Representative disclosures of such prior art are found in U.S. Pat. Nos. 2,854,400; 2,854,403; 2,854,404. Also, it has been suggested, for example, in German OS No. 26 27 822 to conduct reforming in the presence of a catalyst constituting a mixture of platinum on one solid catalyst and rhenium on a second solid carrier.

The use of trimetallic catalysts is also known in the reforming art and, in fact, single particle platinum, rhenium, and iridium catalysts on an alumina support are specifically taught in U.S. Pat. Nos. 3,578,583; 3,617,520; 3,487,009; as well as an article in International Chemical Engineering, 1978.

Recently, there have been advances made in the art on using separate particles containing platinum and rhenium on one support and iridium on another support. Patents of this general type are U.S. Pat. No. 4,288,348; as well as U.S. Pat. No. 4,264,475. All of the above catalysts, while possessing certain advantages, are nevertheless subject to improvement with regard to the provision of a reforming catalyst which provides a high yield of gasoline of high octane number over an extended period of time.

SUMMARY OF THE INVENTION

In accordance with the invention described herein, reforming of a hydrocarbon charge such as naphtha can be effectively carried out over an extended period of time under conditions of high severity to produce a high yield of gasoline of high octane number when the reforming is conducted in the presence of a catalyst which is a modification of the separately supported polymetallic catalysts described and claimed in U.S. Pat. Nos. 4,288,348 and 4,264,475—the disclosure of both said patents being incorporated by reference.

U.S. Pat. No. 4,288,348 discloses catalyst compositions and the use of the same in reforming which contain platinum, rhenium and iridium where (1) platinum and rhenium and (2) iridium are contained on separate particles of a refractory support.

It has now been found that improved results with respect to hydrogen purity and $C_5+$ yields together with decreased methane and ethane production can be achieved with significant yield stability improvements if the iridium containing component also contains rhenium. In addition to the above-listed benefits, the use of a rhenium promoter with iridium enables the catalyst composition to perform under conditions which are more severe than are possible with a catalyst containing an unpromoted catalyst particle.

It is specifically noted that at column 5, lines 5–23 of said U.S. Pat. No. 4,288,348 the following appears:

While, as above described, it is a preferred embodiment of the invention described herein that the present reforming catalyst consist essentially of a mixture of a minor proportion of platinum-rhenium on a support and a minor proportion of iridium on a separate support, the catalyst may optionally contain in addition to platinum-rhenium and iridium, one or several additional catalytic components such as silver osmium, copper, gold, palladium, rhodium, gallium, germanium, tin or compounds thereof on one support containing platinum-rhenium and one or more such additional catalytic components on a second support, which also contains the iridium. The amounts of the added catalytic components may be in the approximate range of 0.01 to 1 weight percent, preferably between about 0.1 and about 1.0 weight percent. The platinum content, rhenium content, iridium content and halogen content of the catalysts is in the same range as set forth hereinabove, with the preferred support being alumina.

As can be seen, although said patent envisions modification of the iridium-containing support with various catalytically active metals, rhenium is not specifically mentioned.

U.S. Pat. No. 4,264,475 discloses the following at column 4, lines 45–62:

While, as above described, it is a preferred embodiment of the invention described herein that the present reforming catalyst consist essentially of a mixture of a minor proportion of platinum on a support and a minor proportion of iridium on a separate support, the catalyst may optionally contain in addition to platinum and iridium, one or several additional catalytic components such as silver osmium, copper, gold, palladium, rhodium, gallium, rhenium, germanium or tin or compounds thereof on one support and one or more such additional catalytic components on a second support which also contains the iridium. The amounts of the added catalytic components may be in the approximate range of 0.01 to 2 weight percent, preferably between about 0.1 and about 1.0 weight percent. The platinum content, iridium content and halogen content of catalysts is in the same range as set forth hereinabove, with the preferred support being alumina.

As can be seen, although there is a broad teaching of promoting both the platinum-containing component and the iridium-containing component with various metals including rhenium, there is no specific teaching of promoting both components with rhenium, particularly at the levels which will be later described.

DESCRIPTION OF THE PREFERRED EMBODIMENTS

The separately supported polymetallic reforming catalysts of this invention comprise a mixture of (1) platinum and rhenium on an appropriate support and (2) iridium and rhenium on an appropriate support. The platinum and iridium individually can range from 0.05 to 5% by weight based on the total composition whereas the rhenium can range from 0.2 to 0.6 based on the total composition. The particularly preferred catalyst contains 0.3% by weight of each of platinum, rhenium and iridium.

The refractory support for utilization in the instant invention is a porous adsorptive material having a surface area exceeding 20 square meters per gram and preferably greater than about 100 square meters per gram. Refractory inorganic oxides are preferred supports, particularly alumina or mixtures thereof with silica. Alumina is particularly preferred and may be used in a large variety of forms including alumina precipitate or gel, alumina monohydrate, sintered alumina and the like. Various forms of alumina either singly or in combination, such as eta, chi, gamma, theta, delta or alpha alumina may be suitably employed as the alumina support. Preferably, the alumina is gamma alumina and/or eta alumina. The above nomenclature used in the present specification and claims with reference to alumina phase designation is that generally employed in the United States and described in *The Aluminum Industry: Aluminum and Its Production* by Edwards, Frary and Jeffries, published by McGraw-Hill (1930). The refractory support, desirably alumina has a preferred particle size of at least 0.01 microns and generally not exceeding about 3000 microns. The alumina may be employed in massive form but generally will be in the form of a powder or in particle form, either irregularly shaped or uniformly shaped as beads, cubes, tablets, extruded pellets, and the like. In the preparation of spheroidal alumina gel particles, an alumina hydrosol is prepared by intimate admixture of suitable reactants and the hydrosol is introduced in the form of globules to a water-immiscible medium, the depth and temperature of which is controlled so that the hydrosol globules set for spheroidal particles of hydrogel during passage through said medium. The resulting hydrogel particles are thereafter withdrawn from the forming zone and conducted to suitable washing, drying and/or calcining equipment as described. Alumina, in the form of a precipitate, may be prepared by adding a suitable reagent such as ammonium hydroxide or ammonium carbonate to an aluminum salt such as aluminum chloride, aluminum nitrate, aluminum acetate, etc. in an amount to form aluminum hydroxide which, upon drying, is converted to alumina. After the alumina has been formed, it is generally washed to remove soluble impurities. Washing procedures ordinarily involve washing with water, either in combination with filtration or as separate operations. It has been found that filtration of the alumina is improved when the wash water contains a small amount of ammonium hydroxide. The extent of washing will depend to some extent on the nature of the reactants initially employed in preparation of the alumina precipitate.

Halogen may be added to the support, preferably alumina, in a form which will readily react therewith in order to obtain the desired results. One feasible method of adding the halogen is in the form of an acid, such as hydrogen fluoride, hydrogen bromide, hydrogen chloride and/or hydrogen iodide. Other suitable sources of halogen include volatile salts, such as ammonium fluoride, ammonium chloride and the like. When such salts are used, the ammonium ions will be removed during subsequent heating of the catalyst. Halogen may also be added as fluorine, chlorine, bromine or iodine or by treatment in gaseous hydrogen halide. The halogen, preferably a chlorine or fluorine moiety, may be incorporated into the catalyst at any suitable stage in the catalyst manufacture. Thus, halogen may be added before, after or during incorporation of the metal or metals. It is preferred to introduce halogen during impregnation with the metal or metals after the alumina has undergone carbon dioxide treatment. One method to accomplish this is to use halogen-containing metal compounds, such as chloroplatinic acid or chloroiridic acid. Additional amounts of halogen may be incorporated in the catalyst by contacting it with materials, such as hydrogen fluoride and hydrogen chloride, either prior to or subsequent to the metal impregnation step. Halogen may also be incorporated by contacting the catalyst with a gaseous stream containing the halogen, such as chlorine or hydrogen chloride. One feasible way to halogenate the alumina is by the addition of an alkyl halide, such as tertiary butyl chloride during the reforming operation. The amount of halogen introduced into the support is such that the halogen content of the overall catalyst is between about 0.1 and about 5 weight percent.

It is an essential feature of the present invention that the alumina base be pretreated with gaseous carbon dioxide prior to impregnation with a solution containing the desired metal or metals. The alumina base either with or without halogen is dried to a water content preferably of less than 30 percent by weight. It is particularly preferred that the alumina base, after drying, be calcined before contact thereof with gaseous carbon dioxide. The dried and/or calcined alumina is thereafter, in accordance with the process of this invention, treated with gaseous carbon dioxide. Such treatment is generally effected under room temperature conditions utilizing a carbon dioxide pressure in the range of between about 100 kPa (0 psig) and 450 kPa (50 psig). The alumina is generally treated with carbon dioxide for a period between about one minute and about 48 hours and more usually between about one minute and about 3 hours. It is to be noted that the time of gas treatment and the gauge pressures set forth above are not considered critical, it being only necessary that the alumina base be exposed to a gaseous carbon dioxide atmosphere for a sufficient period of time and under sufficient pressure to become substantially saturated. The gas initially contained in the pores of the alumina base, which will ordinarily be air, may be replaced by sweeping the alumina particles with gaseous carbon dioxide for a sufficient period of time to replace substantially all of the air in the pores of the alumina with carbon dioxide. It is generally preferred, however, to subject the porous alumina base to a vacuum, thereby removing the air or other gas contained therein and subsequently to contact the evacuated particles with gaseous carbon dioxide. The alumina, after treatment with carbon dioxide, is thereafter impregnated with a solution of a suitable compound(s) of the desired metal or metals. In one preferred embodiment of the invention, the alumina, after pretreatment, is maintained in an atmosphere of gaseous carbon dioxide during the subsequent impregnation. Desirably, the alumina which has undergone pretreatment with gaseous carbon dioxide should be brought into contact with the impregnating solution containing compound(s) of the desired metal or metals immediately after such pretreatment to insure the optimum results of this invention.

A particularly effective method of impregnating the carbon dioxide treated alumina support comprises the use of an aqueous solution of metal containing acids such as chloroplatinic acid, bromoplatinic acid, chloroiridic acid, perrhenic acid ($HReO_4$), etc. A particularly preferred embodiment of this invention involves the preparation of a catalyst comprising Pt-Re on alumina and iridium-rhenium on alumina. In the preparation of such a catalyst two general procedures can be followed. One procedure involves separately treating one alumina support with an aqueous solution of chloroplatinic acid and perrhenic acid and another alumina support with an aqueous solution of chloroiridic acid and perrhenic acid, and then blending the aluminas.

Another procedure involves separately treating one alumina support with an aqueous solution of chloroplatinic acid and another alumina support with an aqueous solution of chloriridic acid, blending the two aluminas together and treating the blended mixture with an aqueous solution of perrhenic acid.

Irrespective of the method employed the appropriate aqueous acid solution is commingled with the carbon dioxide treated alumina particles and the resulting mixture is permitted to stand, preferably with or after suitable agitation, so that thorough mixing is obtained and even distribution of the platinum, iridium, and rhenium solutions throughout the alumina supports is attained. This period of contact will generally be in the approximate range of between about 10 minutes and 48 hours, and more generally between about 10 minutes and 2 hours. Solutions of other compound which may also be suitably employed for impregnation include platinum tetrachloride, ammonium platinum chloride, trimethyl benzyl ammonium platinum chloride, tetraamineplatinum (II) chloride, ammonium platinum nitrate, dinitrodiamineplatinum (II), ammonium perrhenate, perrhenic acid ($HReO_4$), ammonium perrhenate ($NH_4ReO_4$), iridium compounds such as the ammonium chloride double salt, tribromide, trichloride, tetrachloride or chloroiridic acid. Iridium amine complexes may also be suitably employed.

The resulting composites of aluminas and the metals with the combined halogen is dried at a temperature of between about 93° C. (200° F.) and 260° C. (500° F.) for a period of time between about 0.5 hours and 24 hours or longer and thereafter the composite is calcined in the presence of an oxygen containing gas, e.g. air, at a temperature of between about 430° C. (800° F.) and 540° C. (1000° F.) for a period of time of between about 0.5 hour and 12 hours or more. In some instances, said calcination may occur in nitrogen in lieu of air. In addition to calcination, the composite may be exposed in a hydrogen atmosphere to reduce a substantial portion of the metal components to the elemental state. Such reduction is generally conducted at temperatures not in excess of 540° C. (1000° F.).

The relative weight ratio of the separate particles containing platinum-rhenium and those containing iridium-rhenium is generally between about 10:1 and about 1:10. The dimensions of the separate particles may range from powder size, e.g. 0.01 micron up to particles of substantial size, e.g. 10,000 microns. Preferably, the particle size is between about 1 and about 3000 microns.

In a particular embodiment of the method of this invention, alumina beads are pretreated with gaseous carbon dioxide, then, while said beads are mixed by continuous rotation, the beads are impregnated with the appropriate aqueous solutions containing a compound (or complex or complexes) of the desired metals followed by drying and calcination. Post impregnation carbon dioxide treatment may be utilized as a precaution.

The catalyst prepared according to the novel method of the instant invention is particularly useful in the reforming of hydrocarbons. Charge stocks undergoing reforming, using the catalysts described herein, are contemplated as those conventionally employed. These include virgin naphtha, cracked naphtha, gasoline, including FCC gasoline, or mixtures thereof boiling within the approximate range of 20° C. (70° F.) to 260° C. (500° F.) and, preferably within the range of about 50° C. (120° F.) to about 235° C. (450° F.). The charge stock is contacted in the vapor phase with the catalyst at a liquid hourly space velocity between about 0.1 and about 10 and preferably between 0.5 and about 4. Reaction temperature is within the approximate range of 370° C. (700° F.) to 590° C. (1100° F.) and preferably between about 430° C. (800° F.) and about 565° C. (1050° F.). Hydrogen may be added to the reaction zone at a rate corresponding to a mole ratio of hydrogen to hydrocarbon charge of between about 0.5 and about 20 and preferably between about 2 and 12. Reaction pressure is maintained between about 450 kPa (50 psig) and 7000 kPa (1000 psig), preferably between about 795 kPa (100 psig) and 4935 kPa (700 psig). Since the reforming process produces large quantities of hydrogen, at least a portion thereof may be conveniently employed for the introduction of hydrogen with the feed.

It is contemplated that the resultant catalyst of the method of this instant invention may be employed in any of the conventional types of processing equipment. Thus, the catalyst may be used in the form of pills, pellets, extrudates, spheres, granules, broken fragments or various other shapes dispersed as a fixed bed within a reaction zone. The charge stock may be passed through the catalyst bed as a liquid, vapor or mixed phase in either upward or downward flow. The catalyst may also be used in a form suitable for moving beds. In such instance, the charge stock and catalyst are contacted in a reforming zone wherein the charge stock may be passed in concurrent or countercurrent flow to the catalyst. Alternatively, a suspensoid-type process may be employed in which the catalyst is slurried in the charge stock and the resulting mixture conveyed to the reaction zone. The reforming process is generally carried out in a series of several reactors. Usually, three to five reactors are used. The catalyst prepared according to the method of the invention may be employed in just one of the reactors, e.g. the first reactor or in several reactors or in all reactors. After reaction, the product from any of the above processes is separated from the catalyst by known techniques and conducted to distillation columns where the various desired components are obtained by fractionation.

The following examples will now illustrate the best mode contemplated for carrying out the invention.

The supports used in the following examples were commercially obtained spheroidal 1/16 inch gamma alumina beads. Typical analytical properties of these beads is given hereinbelow in Table 1. In general, the supports were humidified before each preparation by storing over water in a closed vessel for at least four hours. This humidification step can be combined with the carbon dioxide pretreatment step if so desired. The humidification step is not essential to achieve the beneficial results afforded by the instant invention. The use of humidification, however, depends on the state of hydration of the support.

TABLE 1

| Typical Analytical Properties of $\gamma$-$Al_2O_3$ Beads | |
| --- | --- |
| Density, Real, g/cc | 2.94 |
| Particle, g/cc | 0.76 |
| Pore Volume, cc/g | 0.97 |
| Surface Area m$^2$/g | 195 |
| % $SiO_2$ | 0.35 |
| % Na | 0.02 |
| % Cl | 0.04 |
| Crystallinity (order-disorder) | intermediate |

EXAMPLE 1

This example will illustrate the preparation of the separately supported polymetallic catalysts of this invention.

The catalyst composite contains 0.3 weight percent platinum, 0.2 weight percent rhenium, and 0.3 weight percent iridium on alumina with carbon dioxide presaturation of both alumina supports.

A double cone blender was filled with humidified $\gamma$-$Al_2O_3$ beads. The blender was attached to a rotary evaporator and was evacuated and backfilled with $CO_2$. The blender was then rotated and, under a partial vacuum, the beads were impregnated with an aqueous solution of $H_2PtCl_6$ so as to provide 0.6 weight percent platinum. The impregnated beads were held under a $CO_2$ atmosphere for one hour and then dried.

A second sample of said alumina beads was similarly treated except that $H_2IrCl_6$ was used in an amount sufficient to provide a composition containing 0.6 weight percent iridium. The two batches of impregnated alumina particles were then mixed in a blender to yield a catalyst having an overall composition of 0.3 weight percent platinum, 0.3 weight percent iridium. The mixture of alumina particles was then treated with carbon dioxide in the manner above set forth and contacted with an aqueous solution of $HReO_4$ so as to provide 0.2 weight percent Re.

The catalyst was pretreated at 850° F. using an $O_2$/HCl mixture in $N_2$ for two hours (5% $O_2$/1% HCl) followed by reduction with $H_2$ for one hour. This catalyst containing 0.3 weight percent each of platinum and iridium and 0.2 weight percent of rhenium is identified as Catalyst A.

EXAMPLE 2

The process of Example 1 was repeated with the exception that enough $HReO_4$ was used to obtain a catalyst containing 0.3 weight percent each of Pt, Ir and Re.

This is identified as Catalyst B and is the most preferred.

EXAMPLE 3

The process of Example 1 was repeated with the exception that enough $HReO_4$ was used to obtain a catalyst containing 0.3 weight percent each of Pt and Ir and 0.6 weight percent Re.

This is identified as Catalyst C.

EXAMPLE 4

This is a comparison example outside the scope of this invention.

In this example, the procedure of Example 1 was repeated except that no rhenium was introduced.

Thus, the catalyst consisted of a mixture of separate particles of iridium-impregnated alumina and platinum impregnated alumina. The catalyst contained 0.3 weight percent each of platinum and iridium and is identified as Catalyst D.

EXAMPLE 5

This is a comparison example outside the scope of this invention.

This example is the catalyst of Example 1 of U.S. Pat. No. 4,288,348 containing platinum-rhenium on a separate alumina support composited with iridium on a separate alumina support so as to obtain a catalyst having 0.3 weight percent each of platinum, iridium and rhenium. The catalyst was pretreated in the same manner as Example 1.

This catalyst is identified as Catalyst E.

EXAMPLE 6

A commercially prepared platinum/rhenium reforming catalyst containing 0.3 weight percent platinum and 0.3 weight percent rhenium on extruded gamma alumina was identified as Catalyst F.

EXAMPLES 7-11

The catalysts prepared according to the general procedures of Examples 1-5 each underwent a catalyst screening test using n-hexane and the charge stock. The conditions for such screening tests were as follows:

| Test conditions: | 0.5 g catalyst |
| --- | --- |
| | $H_2$ Reduction at 454° C. |
| Dehydrocyclization: | Charge Stock n-hexane |
| | WHSV = 3 Hr$^{-1}$ |
| | $H_2$/HC = 7 |
| | Temp. = 470° C. |
| | Time = 60 minutes |

The screening test was conducted by first reducing the catalyst sample with hydrogen at 454° C. and the temperature was raised to 470° C. and then n-hexane was passed over the catalyst sample at the above-stated conditions for 60 minutes.

During the period at which the catalyst was contacted with normal hexane the methane make and the benzene make were determined. The benzene make is a direct measure of the dehydrocyclization activity of the catalyst and, of course, the methane make determines the practical significance of a catalyst in a reforming process since too high a methane make significantly reduces reformate yield and hydrogen production and can accelerate catalyst aging.

The results obtained are shown in the following table.

TABLE 2

| Catalyst Screening Test Results | | | | | |
|---|---|---|---|---|---|
| Example | 7 | 8 | 9 | 10 | 11 |
| Catalyst | A | B | C | D | E |
| Wt. % Pt | 0.3 | 0.3 | 0.3 | 0.3 | 0.3 |
| Wt. % Re | 0.2 | 0.3 | 0.6 | 0.0 | 0.3 |
| Wt. % Ir | 0.3 | 0.3 | 0.3 | 0.3 | 0.3 |
| $nC_6$ % Conv. | 53.0 | 64.2 | 47.2 | 62.7 | 57.8 |
| Benzene Yield, % | 9.7 | 9.7 | 8.8 | 11.7 | 10.5 |
| Methane Yield, % | 3.6 | 5.8 | 2.9 | 19.6 | 18.0 |
| Benzene Selectivity[1] | 18.3 | 15.1 | 18.6 | 18.7 | 18.2 |
| Methane Selectivity[2] | 6.8 | 9.0 | 6.1 | 31.3 | 31.1 |

[1]Benzene Selectivity = $\frac{\text{Wt. \% Benzene Yield}}{\text{Total n-}C_6\text{ Conversion}} \times 100$

[2]Methane Selectivity = $\frac{\text{Wt. \% Methane Yield}}{\text{Total n-}C_6\text{ Conversion}} \times 100$ The relative aromatization characteristics of catalysts are given by the benzene yield and selectivity values, while the degree of hydrocracking promoted by them is manifested in the methane yield and selectivity data.

The test results indicate that catalysts A, B and C improves the activity of the catalyst and moderates the severe hydrocracking usually associated with separate particle catalysts having an unpromoted iridium component such as Catalysts D and E.

EXAMPLES 12–15

The catalysts B, D, E and F above were further tested for reforming using a full range naphtha with the following properties:

| Properties | |
|---|---|
| Gravity, API | 61.8 |
| Specific Gravity | 0.7365 |
| Sulfur, ppm | <0.2 |
| Nitrogen, ppm | <0.2 |
| Chloride, ppm | <1 |
| Distillation, °F. | |
| IBP | 169 |
| 10% vol. | 201 |
| 30% | 223 |
| 50% | 253 |
| 70% | 286 |
| 90% | 320 |
| EP | 354 |
| Composition, wt. % | |
| Paraffins | 70.9 |
| Naphthenes | 17.8 |
| Aromatics | 11.2 |

Reforming of the above charge was carried out in adiabatic three reactor system with recycle. Alcohol, organochloride, and sulfur was added to the naphtha as indicated below to simulate exact commercial conditions. The other operating parameters are listed below with the comparisons.

TABLE 3

| Yield Comparison of Various Iridium Containing Catalysts | | | | |
|---|---|---|---|---|
| Example | 12 | 13 | 14 | 15 |
| Pressure, psig | 200 | → | → | → |
| TRR | 6 | → | → | → |
| WHSV | 2 | → | → | → |
| LHSV | 1.4 | → | → | 1.84 |
| Sulfur, ppm | 2 | → | → | → |
| R + O | 98 | → | → | → |
| Catalyst | B | D | E | F |
| Days on Stream | 21 | 21 | 21 | 21 |
| RIT, °F. | 977 | 1008 | 953 | 961 |
| $C_5+$ Yield, vol % | 73.4 | 68 | 71.8 | 72 |
| $H_2$ Purity, mol % | 71.9 | 51.7 | 67.2 | 68.7 |
| $H_2$ Prod., SCF/BBL | 771 | 463 | 773 | 729 |
| $C_1$, wt. % | 1.9 | 3.8 | 2.7 | 2.3 |
| $C_2$, wt. % | 4.4 | 7.3 | 6.2 | 5.0 |
| $C_3$, wt. % | 5.7 | 5.6 | 6.0 | 6.1 |
| $C_4$, wt. % | 8.2 | 9.6 | 7.5 | 8.0 |

Catalyst B has a lower activity than Catalyst E. Despite its lower activity Catalyst B has superior $C_5+$ yields and hydrogen purity over that of the above mentioned catalysts. The hydrogen production of Catalyst B is comparable to that of the trimetallic Catalyst E and much higher than Catalyst D. The higher $C_5+$ yields and yield stability of Catalyst B over that of the unpromoted iridium catalysts is apparent from its lower methane and ethane yields. Such a low yield of $C_1$–$C_2$ gases is characteristic of Pt+Ir catalysts. The propane yields from all catalysts are very similar.

The coke levels on the individual components of the spent Catalyst B are compared with those of Catalyst D and Catalyst E. These results indicate that the coke levels on Catalyst D are the highest despite its cycle length being the shortest. Catalyst B results in a higher coke level on the iridium component than Catalyst E despite its stable yields. This could be due to the lower activity of the iridium when combined with rhenium.

| Coke Levels on Spent Catalysts | | | | | |
|---|---|---|---|---|---|
| | Catalyst D | | Catalyst E | | Catalyst B |
| | Pt | Ir | Pt + Re | Ir | Pt + Re | Ir + Re |
| Reactor 1 | 9.9 | 6.4 | 6.99 | 4.65 | 7.06 | 3.66 |
| Reactor 2 | 14.0 | 9.7 | 12.24 | 7.83 | 11.26 | 9.06 |
| Reactor 3 | 16.3 | 13.4 | 15.81 | 9.13 | 16.93 | 12.53 |

Catalyst B results in higher $C_5+$ yields and hydrogen purity over that of an unpromoted catalyst. Such a catalyst also shows considerable yield stability, despite a lower activity over that of the trimetallic Pt+Re/Ir catalyst (Catalyst E), due to the promotion of the iridium component. The higher $C_5+$ yields are obtained through lower $C_1$–$C_2$ production.

What is claimed is:

1. A reforming process which comprises contacting a reforming charge stock under reforming conditions with a catalyst composition made up of a mixture of two components one component comprising a minor proportion of platinum and rhenium on a carbon dioxide treated support and the second component comprising a minor proportion of iridium and rhenium on a separate carbon dioxide treated support.

2. The process of claim 1 wherein said support is an inorganic oxide.

3. The process of claim 1 wherein said support is alumina.

4. The process of claim 3 wherein the platinum and iridium are present in amounts ranging from 0.05 to 5 weight percent of each of said metals and rhenium is present in an amount of from 0.2 to 0.6 weight percent.

5. The process of claim 4 wherein said platinum, iridium and rhenium are each present in an amount of about 0.3 weight percent based on total catalyst composition.

* * * * *